United States Patent [19]

Gureff

[11] Patent Number: 5,552,200
[45] Date of Patent: Sep. 3, 1996

[54] PAPER NAPKIN

[76] Inventor: Arnold Gureff, 41-09 41st St., Sunnyside, N.Y. 11104

[21] Appl. No.: 423,364

[22] Filed: Apr. 18, 1995

[51] Int. Cl.[6] .................................. B32B 3/10; B32B 7/14
[52] U.S. Cl. .......................... 428/41.9; 428/343; 428/354
[58] Field of Search .............................. 428/40, 343, 354, 428/261

[56] References Cited

U.S. PATENT DOCUMENTS

| | | | |
|---|---|---|---|
| 3,916,447 | 11/1975 | Thompson | 2/46 |
| 3,978,553 | 9/1976 | Honig | 428/40 |
| 4,288,877 | 9/1981 | Klepfer | 2/48 |
| 4,330,888 | 5/1982 | Klepfer | 2/48 |
| 4,420,519 | 12/1983 | Slemmons | 428/40 |
| 4,530,867 | 7/1985 | Gorman | 428/41 |
| 4,815,457 | 3/1989 | Mazars | 128/155 |
| 4,959,265 | 9/1990 | Noreen . | |
| 5,133,704 | 7/1992 | Wheeler . | |
| 5,187,813 | 2/1993 | Klein | 2/16 |
| 5,328,265 | 7/1994 | Clooney | 383/4 |

FOREIGN PATENT DOCUMENTS

| | | |
|---|---|---|
| 2438231 | 9/1975 | Germany . |
| 5076569 | 9/1991 | Japan . |
| 4073214 | 3/1992 | Japan . |
| 154311 | 9/1979 | United Kingdom . |
| 9213040 | 8/1992 | WIPO . |

OTHER PUBLICATIONS

Preliminary search results (see attached).

Primary Examiner—Jenna L. Davis
Attorney, Agent, or Firm—Chase & Yakimo

[57] ABSTRACT

A three layered, rectangular, paper napkin which includes a top, middle and bottom layer attached together and having a first and second fold line which divide the napkin into four substantially equal sized portions and facilitate storage of the napkin in a folded configuration. The fold lines preferably intersect at substantially the center point of the napkin. The top layer is absorbent to soak up and catch any spilled substance, such as food or drink. The middle layer is fixed between the top and bottom layers and is moisture resistant to prevent any spilled substance from passing through the napkin. The bottom layer includes a plurality of adhesive strips for attaching and securing the napkin to its user's garment upon the removal of a cover attached to each adhesive strip, which exposes each strip's adhesive surface. One adhesive strip is attached to the bottom layer in each of the sections, and the strips extend radially from the center point of the napkin so that the strips are concealed when the napkin is in its folded configuration.

9 Claims, 3 Drawing Sheets

PAPER NAPKIN

FIELD OF THE INVENTION

This invention relates to a paper napkin that prevents most any spilled substance, such as food or drink, from staining the napkin user's garment and that is easily securable to the user's outer garment in any desired position.

BACKGROUND OF THE INVENTION

Table napkins are, of course, quite common. However, typical paper and cloth napkins have several disadvantages. They are usually formed of a single absorbent paper or cloth layer which does not prevent the napkin user's garment from being stained after a large spill of food or drink. Also, since napkins are inherently lightweight they can easily and unknowingly slide off of the user's lap. Furthermore, especially with respect to paper napkins, they often will not stay unfolded due to the fold lines and lightweight character.

SUMMARY OF THE INVENTION

Accordingly, a primary object of the subject invention is to provide a multi-layered napkin securable to the user's garment via adhesive strips.

A further object of the subject invention is to provide a napkin with at least one absorbent layer and one moisture resistant layer for handling large food and beverage spills.

Still a further object of the subject invention is to provide a napkin securable to the user's garment by adhesive strips which prevent napkin slippage.

Yet a further object of the subject invention is to provide a nonslippable, highly absorbable paper napkin folded for easy storage and packaging which is inexpensive to manufacture and easy to use.

These objects are attained by providing a three layered, rectangular, paper napkin including a top, middle and bottom layer attached together and having a first and second fold line which divide the napkin into four substantially equal sized portions and facilitate storage of the napkin in a folded configuration. The first fold line extends the length of the napkin and the second fold line extends the width of the napkin so that the first and second fold lines intersect at substantially the center point of the napkin. The top layer is absorbent to soak up and catch any spilled substance, such as food or drink. The middle layer is fixed between the top and bottom layers and is moisture resistant to prevent any spilled substance from passing through the napkin. The bottom layer is also absorbent and includes a plurality of adhesive strips for attaching and securing the napkin to its user's garment upon removal of a cover attached to each adhesive strip to expose the strip's adhesive surface. One adhesive strip is attached to the bottom layer in each of the sections so that the strips extend radially from the center point of the napkin and are concealed when the napkin is in its folded configuration.

DESCRIPTION OF THE PREFERRED EMBODIMENT

Napkin 10, in accordance with the present invention, as in FIGS. 1–4, has three layers 12, 14 and 16 and a first and second fold line 18 and 20.

Figure 1:
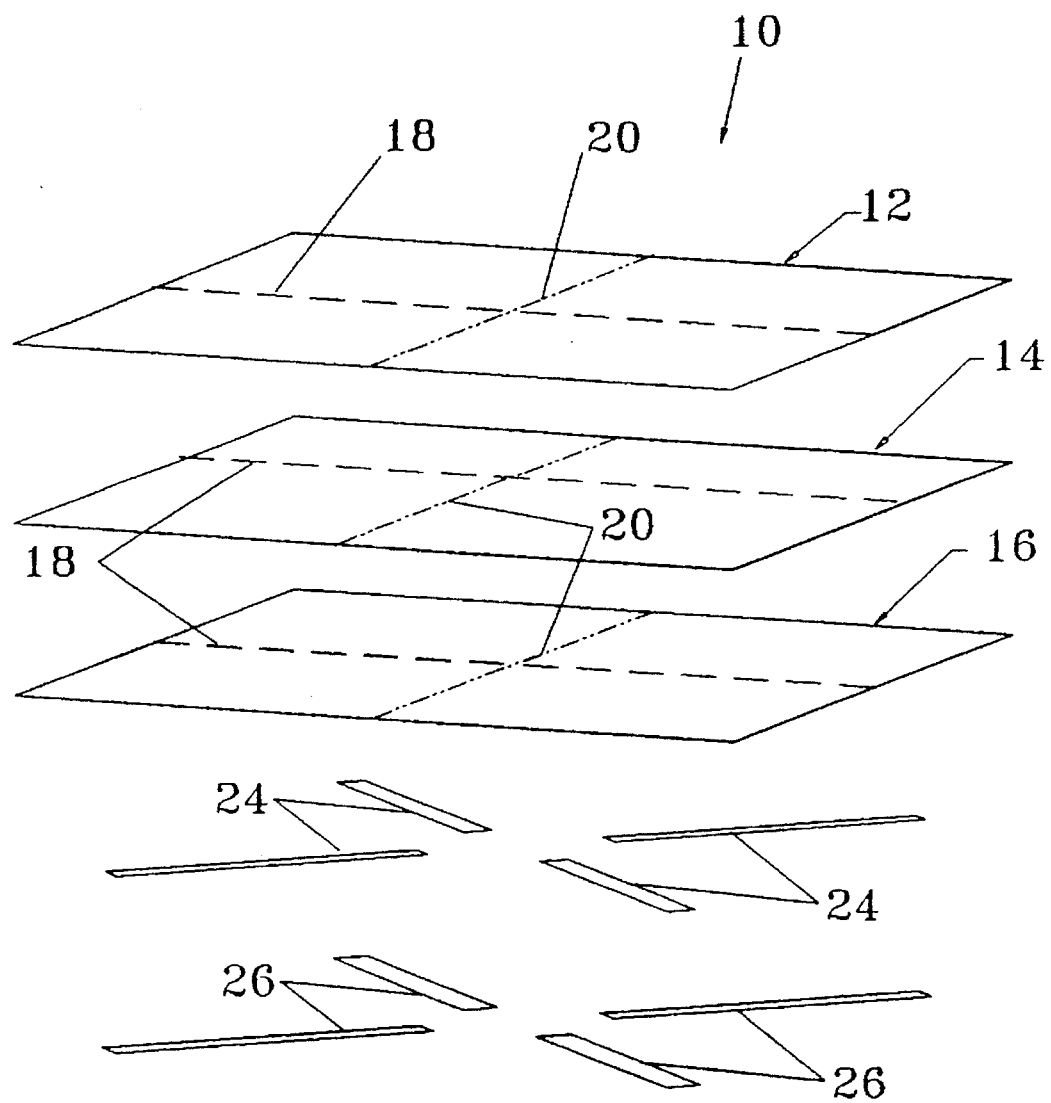
FIG. 1 is an exploded perspective view of a napkin in accordance with the present invention.
Figure 2:
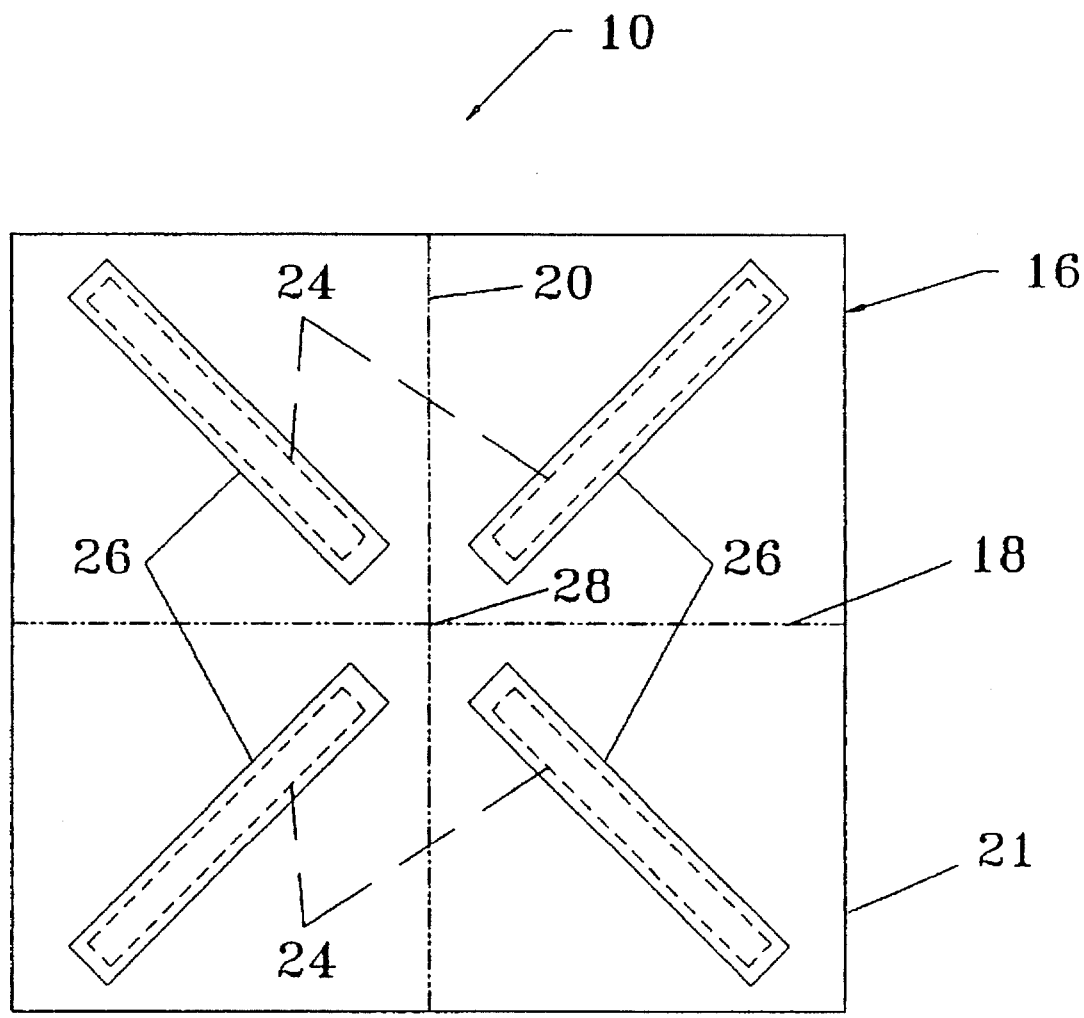
FIG. 2 is a bottom plan view of the napkin of FIG. 1.

Layers 12, 14 add 16 are each preferably rectangular and the same size. They are unitarily and integrally attached together in alignment with each other to form napkin 10 with outer edge 21, as shown in FIGS. 1 and 2. Top layer 12, as seen in FIG. 1, is preferably composed of absorbent, flexible paper material. Although it could be composed of cloth, this is, of course, more costly. Top layer 12 absorbs and catches any spilled substance, such as food or drink, and prevents it from damaging the napkin user's clothes or garments.

Middle layer 14 is attached between top and bottom layers 12 and 16. Middle layer 14 is composed of moisture resistant material, preferably thermoplastic film designed to repel liquid or moisture. Middle layer 14 improves the protection provided by other commonly used napkins. Napkin 10 can handle larger spills, since liquid and other substances cannot soak through napkin 10 onto the user's clothes. Such absorption is prevented by middle layer 14.

Figure 3:
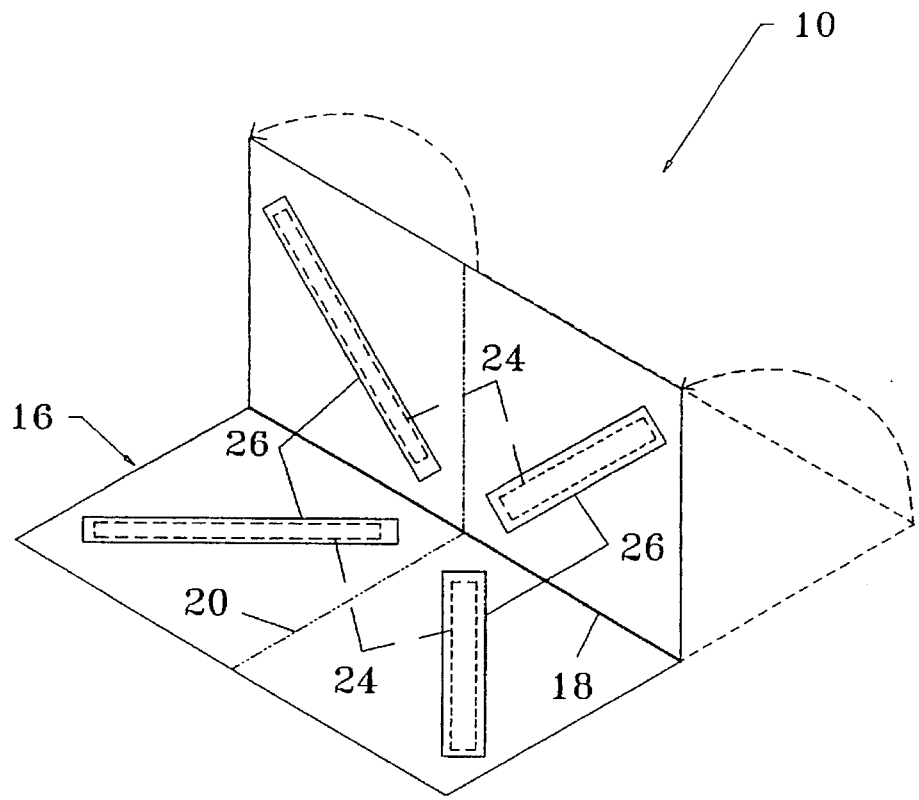
FIG. 3 is a bottom plan view of the napkin as in FIG. 2, but shows the napkin being folded along its first fold line.

Bottom layer 16 is also preferably composed of absorbent, flexible paper material identical to top layer 12 and thus, provides an additional layer of protection to the user of napkin 10 which may be needed, especially if middle layer 14 is somehow punctured. Bottom layer 16 includes pressure sensitive adhesive strips 24, as seen in FIGS. 1–3. Preferably, bottom layer 16 includes four such adhesive strips 24. Before use of napkin 10 by the user, the strips' 24 adhesive surface is protected by strip covers 26, which are formed of an easily removable, peelable plastic material. Covers 26 prevent the self adhesion of adhesive strips 24 prior to use of napkin 10 and/or other unwanted adhesion to other articles.

Upon removal of covers 26, napkin 10 can be positioned in the user's lap, across the user's chest or in any other desired position and easily adheres via adhesive strips 24 to the user's clothes. Strips 24 prevent the slippage of napkin 10, so that napkin 10 does not unknowingly become displaced or fall from the lap of the user.

First fold line 18 extends across the length of napkin 10 and second fold line 22 extends across the width of napkin 10 so that they intersect at the center point 28 of napkin 10, as best seen in FIG. 2. Thus, fold lines 18 and 20 form napkin 10 into four rectangular sections which are substantially the same size. Preferably, one adhesive strip 24 is attached to bottom layer 16 within each one of these sections. Although adhesive strips 24 may be attached across the length or width of each section, strips 24 preferably extend radially from center point 28 and diagonally across napkin 10, as best seen in FIG. 2 so as to optimally perform the securing function.

Figure 4:
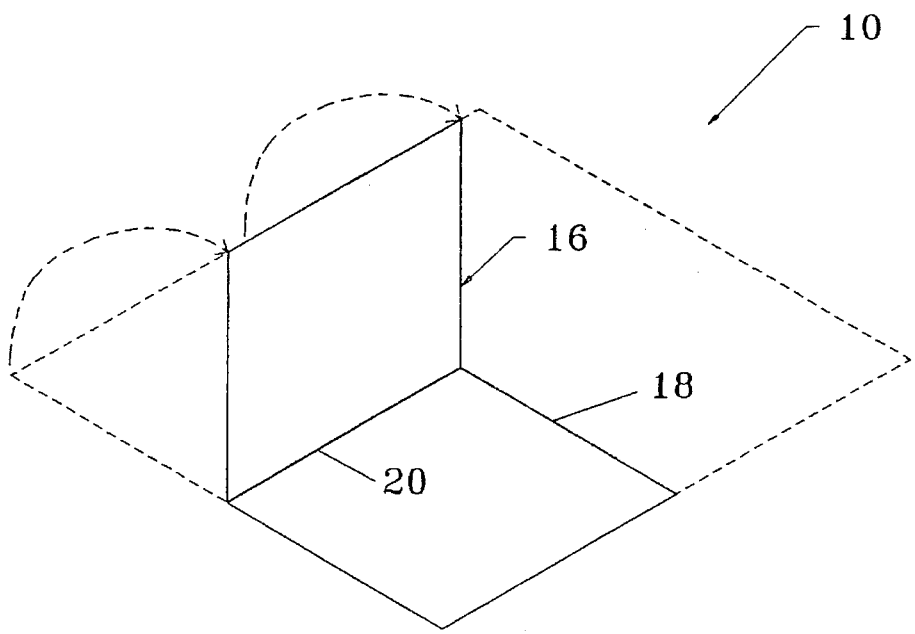
FIG. 4 is a bottom plan view of the napkin of FIG. 3 after being folded along its first fold line and further showing the napkin being folded along its second fold line.

Fold lines 18 and 20 allow napkin 10 to be stored and packaged in a folded configuration, as shown by FIGS. 3 and 4. In this folded configuration, adhesive strips 24 are concealed, which is preferable for aesthetic purposes. Specifically, napkin 10 is first folded along first fold line 18, as shown by arrows of FIG. 3. Then, napkin 10 is folded along second fold line 20 as shown by arrows of FIG. 4. This method effectively hides adhesive strips 24 until the user of napkin 10 unfolds napkin 10 for use thereof and removes covers 26 from adhesive strips 24. Adhesive strips 24, upon being secured to the user's clothing, prevent napkin 10 from refolding itself along fold lines 18 and 20, which typical napkins have a tendency to do.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A napkin, comprising:

three rectangular layers including a top, middle and bottom layer attached together and having a first and second fold line which divide the napkin into four substantially equal sized sections and facilitate storage of the napkin in a folded configuration;

said first fold line extending the length of the napkin and said second fold line extending the width of the napkin so that said first and second fold lines intersect at substantially the center point of the napkin;

said top layer being absorbent to soak up and catch any spilled substance;

said middle layer fixed between said top and bottom layers and being moisture resistant to prevent the spilled substance from passing through the napkin; and said bottom layer including a plurality of adhesive strips for attaching and securing the napkin to its user's garment upon removal of a cover attached to each adhesive strip to expose each strip's adhesive surface, said adhesive strips being concealed when the napkin is in its said folded configuration.

2. A napkin as claimed in claim 1, wherein said bottom layer is absorbent.

3. A napkin as claimed in claim 1, wherein one said adhesive strip is attached to said bottom layer in each of said sections.

4. A napkin as claimed in claim 3, wherein said adhesive strips extend radially from said center point of the napkin in each of said strip's corresponding section.

5. A napkin, comprising:

a bottom and a top absorbent layer;

a middle moisture resistant layer fixed between said bottom and top layers;

said layers having a first and second fold line which divide the napkin into four sections and facilitate storage of the napkin in a folded configuration, said fold lines intersecting at substantially the center point of the napkin;

said bottom layer having a plurality of adhesive strips attached thereto for adhering the napkin to a user's garment and preventing slippage of the napkin upon removal of a corresponding strip cover attached to each said strip, one said adhesive strip being attached to said bottom layer in each of said sections;

said top layer for catching and absorbing any spilled substance; and said middle layer preventing the spilled substance from soaking into the user's garment.

6. A napkin as claimed in claim 5, wherein said adhesive strips are concealed when the napkin is in its said folded configuration.

7. A napkin as claimed in claim 6, wherein said adhesive strips extend substantially radially from said center point of the napkin.

8. A napkin as claimed in claim 5, wherein said top and bottom layers are composed of paper material and said middle layer is composed of plastic material.

9. A napkin, comprising:

three layers including a top, middle and bottom layer attached together and presenting an outer edge of the napkin;

a first and second fold line which divide the napkin into four substantially equal sized sections and facilitate storage of the napkin in a folded configuration;

said first fold line extending the length of the napkin and said second fold line extending the width of the napkin so that said first and second fold lines intersect at substantially the center point of the napkin;

said top layer being absorbent to soak up and catch any spilled substance;

said middle layer fixed between said top and bottom layers and being moisture resistant to prevent the spilled substance from passing through the napkin;

said bottom layer including a plurality of adhesive strips for attaching and securing the napkin to its user's garment upon removal of a cover attached to each adhesive strip to expose each strip's adhesive surface, said adhesive strips being concealed when the napkin is in its said folded configuration; and one of said adhesive strips extending within each one of said sections from substantially said center point to said outer edge of the napkin.

* * * * *